June 15, 1965     O. STIEBER ETAL     3,188,875

VARIABLE SPEED TRANSMISSION

Filed July 23, 1963     2 Sheets-Sheet 1

INVENTORS:
Ortwin Stieber
Hugo Wutz

BY

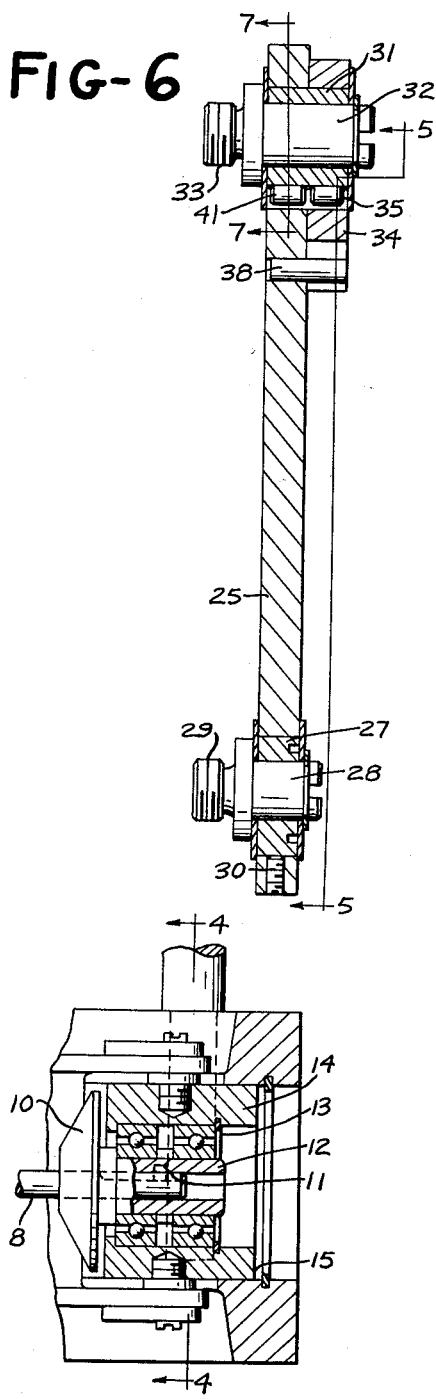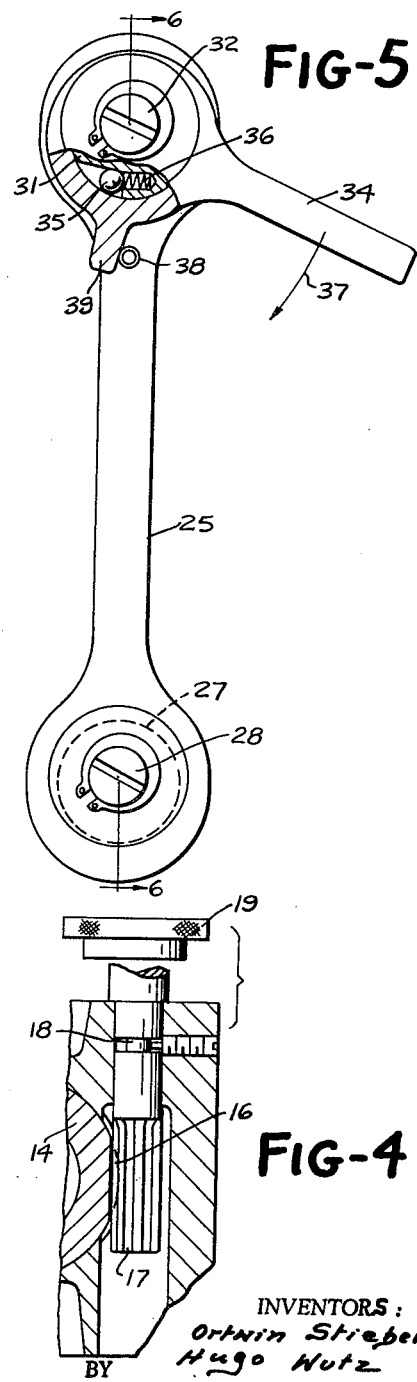

United States Patent Office 3,188,875
Patented June 15, 1965

3,188,875
VARIABLE SPEED TRANSMISSION
Ortwin Stieber, Moosacher Str. 51, Munich, Germany, and Hugo Wutz, Munich, Germany; said Wutz assignor to said Stieber
Filed July 23, 1963, Ser. No. 296,964
Claims priority, application Germany, Aug. 7, 1962, St 19,575
12 Claims. (Cl. 74—192)

This invention relates to variable speed power transmission units, and particularly to units of this nature in which a rigid drive ring transmits power between two pairs of cones.

Power transmissions of this nature are disclosed, for example, in the Heynau Patents 2,032,015 and 2,611,276, and in the Kuner et al. Patent 2,441,276.

In transmissions of the nature referred to, the pairs of cones interconnected by the steel ring are mounted for rotation on parallel axes and one cone of each pair is non-axially movable and the other cone of each pair is axially movable. The axially movable cones of the respective pairs are on respectively opposite sides of the steel drive ring and these cones therefore move in the same direction in adjusting the drive ratio of the transmission. Since the movable cones move in the same direction they can be interconnected by link means so that they take equal amounts of movement. It is in particular connection with such interconnecting link means that the present invention is concerned.

An important factor in transmissions having cone pairs interconnected by a steel drive ring is the pressure that is maintained between the drive ring and the cones. This pressure must be adequate for transmitting the required amount of power, but must not be so high as to create excessive bearing loads or to promote rapid wear of the ring or cones.

Still further, it is of advantage to maintain the pressure substantially constant over long periods of time even though some wear takes place on the ring and cones.

Heretofore, various attempts have been made to maintain the aforementioned pressure substantially constant, and among these attempts is one wherein the two movable cones are interconnected by a turn-buckle-like arrangement that includes a threaded rod. This threaded rod is biased torsionally in a direction to shorten the rod, thereby tending to increase the pressure between the drive ring and the cones. The torsion on the threaded rod is obtained by a torsion spring mounted thereon and adjustable at one end.

This arrangement has the drawback that the initial setting of the torsion spring is dependent on the individual mechanic effecting the adjustments and this can vary from one individual to the other. Furthermore, there is considerable friction between the threads of the rod and the threaded member which it engages so that the spring is normally set to overcome this frictional resistance and this, in turn, will bring about that under conditions of vibration of the transmission, or once the threaded rod commences to turn, the aforementioned friction is eliminated or converted into sliding friction, so that the torsional pressure on the spring will produce too high a pressure between the drive ring and the cones and the life and efficiency of the transmission is accordingly greatly reduced.

In another arrangement the pressure force between the drive ring and the cones is effected by a shifting mechanism which is actuated with each adjustment of the drive ratio of the transmission. This adjusting occurs whether or not an adjustment is actually required, so that extremely high pressures can result unless specially formed drive elements for the shifting mechanism are employed.

It is found, however, that this arrangement cannot be depended upon to operate satisfactorily for any length of time.

With the foregoing in mind, a primary object of the present invention is the provision of an improved and highly reliable arrangement for maintaining substantially constant the pressure between the drive ring in a transmission of the nature referred to and the cone discs thereof.

Another object of the present invention is the provision of an arrangement for effecting adjustment of the spacing of the movable cone discs in a transmission of the nature referred to whenever the pressure between the cone discs and the drive ring falls below a predetermined amount while at the same time the arrangement will not yield excessive pressures between the drive ring and the cone discs.

A still further object of the present invention is the provision of adjustable link means for connecting the movable cone discs of a transmission of the nature referred to which can be preset at the time of assembly of the transmission and which will thereafter automatically maintain the desired pressure between the drive ring and the cone discs but without producing excessive pressure therebetween.

Still another object of the present invention is the provision of adjustable link means for interconnecting the movable cone discs of a variable speed transmission of the type described in which adjustment of the effective length of the link means is accomplished in response to adjustment of the drive ratio of the transmission but impositively so that excessive adjustment of the link means is not possible.

These and other objects and advantages will become apparent by reference to the following detailed description and accompanying drawings wherein:

FIGURE 3 is a fragmentary sectional view indicated by line 3—3 on FIGURE 1 and showing the bushing receiving one of the movable cone discs and the connection thereto of the adjustable link means;

FIGURE 4 is a fragmentary sectional view indicated by line 4—4 on FIGURE 1 showing the mechanism for moving the movable cone discs to change the drive ratio of the transmission;

FIGURE 5 is an elevational view partly broken away of one of the adjustable length link means and drawn at enlarged scale, said view being taken along line 5—5 of FIGURE 6;

FIGURE 6 is a vertical sectional view of the adjustable length link means and as indicated by line 6—6 on FIGURE 5.

Figure 1:
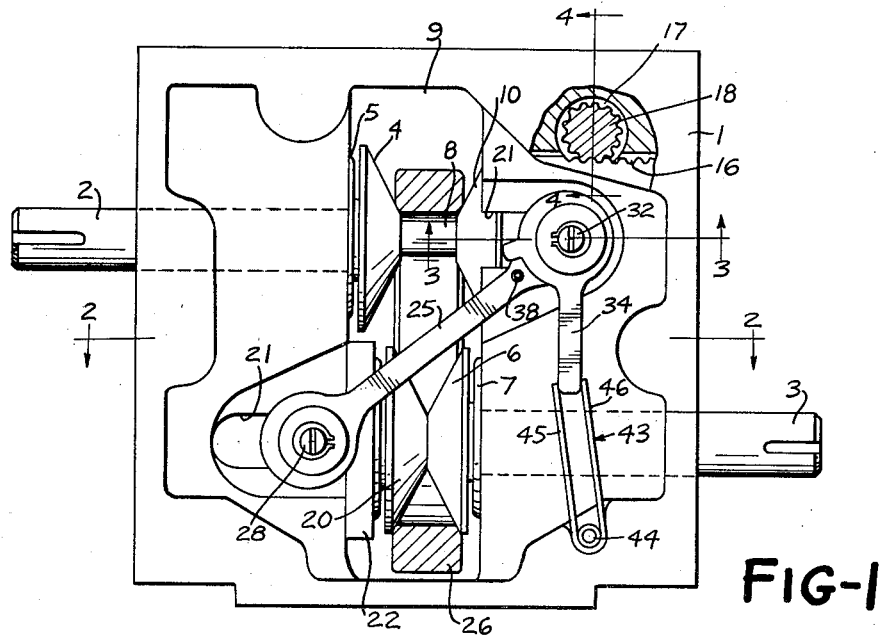
FIGURE 1 is a side elevational view of a transmission of the nature referred to and having adjustable length link means according to the present invention associated therewith.

Referring to the drawings somewhat more in detail, a transmission according to the present invention comprises a frame part 1, and extending from the frame part are shaft means 2 and 3, either of which can form the input shaft and either of which can form the output shaft.

Associated with shaft 2 and fixedly mounted thereon is a cone disc 4 which is rotatably journalled in frame 1 by bearing means 5. Cone disc 4 is non-axially movable in the frame.

Similarly, associated with shaft 3 is a cone disc 6 journalled in the frame by bearing means 7 and non-axially movable in the frame.

Shaft means 2 has a reduced diameter portion 8 that extends completely across the central opening 9 of frame 1 and through a second cone disc 10 which is axially aligned with cone disc 4.

As will be seen in FIGURE 3, reduced diameter portion 8 of shaft 2 is keyed by key 11 to hub portion 12 which is rigid with cone disc 10. Hub portion 12 is supported by anti-friction bearings 13 in a bushing sleeve 14 axially slidable in bore 15 of frame 1.

It will be apparent that cone discs 4 and 10 are drivingly interconnected, while disc 10 is axially movable toward and away from disc 4.

For moving disc 10, sleeve 14 has one side formed with teeth at 16 and these are engaged by teeth 17 on a rod 18 that extends out one side of the frame and has connected thereto an adjusting knob 19.

Pertaining to cone disc 6 is another cone disc 20 axially aligned therewith and supported on bearings within a sleeve in the same manner as described above in connection with cone disc 10. Cone disc 20 is adapted for movement toward and away from cone disc 6 while being drivingly keyed thereto in the same manner as described in connection with cone discs 4 and 10.

The frame 1 adjacent each of the cavities in which the supporting sleeves for cone discs 10 and 20 are mounted is provided with slots 21 and these slots are availed of for making connection with the sleeves so that the cone discs can be moved in unison. The sleeve pertaining to cone disc 10 has been identified by reference numeral 14 and the corresponding sleeve pertaining to cone disc 20 is identified by reference numeral 22.

The aforementioned sleeves are interconnected by the arms or adjustable link means 25 arranged one on each side of frame 1 and extending diagonally from one of the aforementioned sleeves to the other. These link means or arms are availed or for controlling the axial spacing between cone discs 10 and 20 to maintain the proper pressure between the cone disc pairs and the annular drive ring 26 which surrounds both of the pairs of cone discs and effects driving connection therebetween in a well known manner.

With regard to the adjustable link means 25, the construction thereof will be better seen in FIGURES 5 and 6. Arranged in each of the arms at the one end, for example, adjacent sleeve 22, is a first eccentric 27 rotatable in the arm and having extending rotatably therethrough stud 28 having a threaded portion 29 for threading into the sleeve 22. The eccentric 27 is for the purpose of effecting an initial adjustment of the effective length of the pressure arm and is ordinarily set at the time of assembling the transmission and can then be locked in its adjusted position by any suitable means, such as set screw 30.

At the other end of arm 25 there is a second eccentric 31 and extending rotatably through this eccentric is a second stud 32 having a threaded portion 33 for being threaded into sleeve 14 of cone disc 10. The eccentric 31 is the eccentric which is automatically adjustable during operation of the transmission to maintain the required pressure between the drive ring and conical discs.

To this end, there is a swingable lever 34 rotatably mounted on eccentric 31 and drivingly connected with the eccentric in one direction of movement of the arm by the one-way clutch means represented by roller 35 and spring 36.

As will be seen in FIGURE 5 the lever 34 is drivingly connected with eccentric 31 when the lever moves in the direction of arrow 37, but there is no driving connection between the arm and the eccentric in the other direction of movement of the lever.

A stop pin 38 in arm 25 is operable to stop lever 34 in one extreme position on account of the finger 39 provided on the lever.

Figure 7:
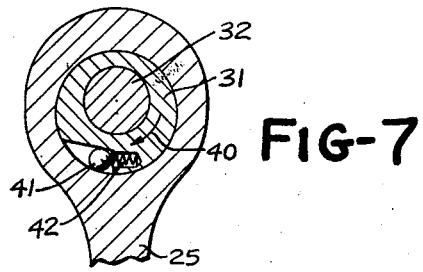
FIGURE 7 is a fragmentary view indicated by line 7—7 on FIGURE 6 showing a one way clutch arrangement disposed between the arm means and an eccentric element forming a part of the arm means.

As will be seen in FIGURE 7 eccentric 31 is further provided with one-way clutch means between the eccentric and arm 25, so that the eccentric can be moved in the arm means in the direction of arrow 40 in FIGURE 7, whereas the clutch means will prevent rotation of the eccentric in the arm in the other direction. This second mentioned one-way clutch means can also take the form of a roller 41 biased by spring means 42.

The above-described structure for adjusting eccentric 31 in arm 25 is actuated in response to adjustment of the drive ratio of the transmission. This is accomplished, as will be seen in FIGURES 1 and 2, by providing a U-shaped spring element 43, having its closed end fixedly anchored in place in the frame as by roll pin means 44, while the upper open end of the U-shaped element receives between its legs 45 and 46 the outermost end of the swingable lever 34.

Figure 2:
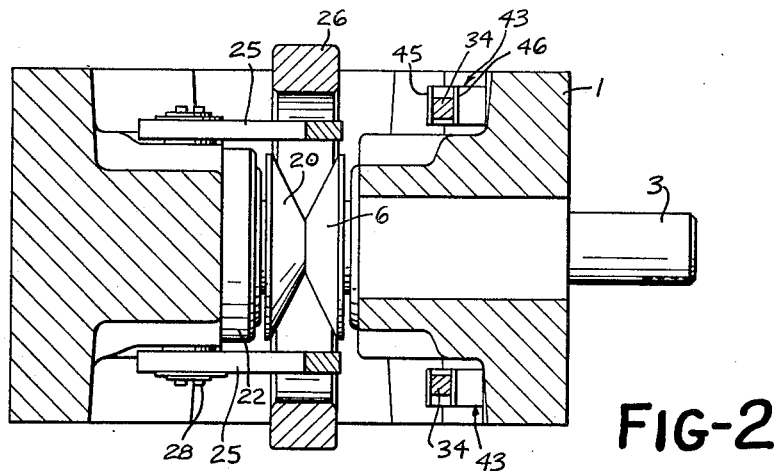
FIGURE 2 is a plan sectional view indicated by line 2—2 on FIGURE 1.

It will be appreciated that adjustment of the transmission in a direction to move the movable cone discs rightwardly, as the transmission is viewed in FIGURE 1, will tend to cause lever 34 to move about the axis of the eccentric in a direction to adjust the eccentric to increase the pressure between the steel drive ring and the cone discs. The degree of adjustment, however, is limited by the strength of the U-shaped spring element, so that the pressure can never exceed a predetermined amount. The pressure is thus automatically maintained at the proper amount and tends continuously to be adjusted as the drive ratio of the transmission is adjusted, but the pressure of the drive ring on the cone discs can never become excessive.

This pressure is limited because when the pressure reaches a predetermined amount rotation of eccentric 31 will be resisted and it can only be adjusted when the bias thereon by the U-shaped spring exceeds the degree of resistance offered by the pressure existing between the drive ring and the cone discs.

The described arrangement is thus entirely self-regulating and excessive pressures never result.

The described arrangement is also much less sensitive to vibration than the aforementioned torsionally biased screw adjustment device, because there is less friction in the eccentric arrangement of the present invention and there is less mechanical advantage built into the device between the U-shaped adjusting spring and the eccentric which it operates, so that there is less chance that the adjustment will overshoot, on account of elimination of friction by vibration or through the conversion of static friction into sliding friction when the eccentric commences to move.

It has been found that the device of the present invention works very well in practice and excessive pressures between the drive ring and the cone discs never occur.

The arms 25 in being arranged diagonally between the support sleeves for the movable cone discs serve to absorb tilting forces exerted on the cone discs because of the transmission of power through the transmission. This in an improvement over previous arrangements wherein the interconnecting links between the movable cone discs were arranged parallel to the input and output shafts.

A further feature of the present invention is to be found in the provision of the stop pin 38 which limits the angular movement of adjusting lever 34 relative to its pertaining arm. This stop pin, in limiting the angular movement of the associated lever 34 limits the amount of deflection that can be imparted to leg 46 of spring 43 so that the spring will be working within a predetermined limited range within which the characteristics thereof are constant. The leaf spring is thus prevented from being flexed to the point that its resistance will increase sufficiently to provide excessive force on lever 34 which would, of course, bring about excessive force between the drive ring and the cone discs.

It will be understood that this invention is susceptible to modification in order to adapt it to different usages and conditions and accordingly, it is desired to compre-

We claim:

1. In an infinitely variable speed transmission; a frame, a pair of parallel shafts in the frame having co-extensive portions, a set of two cone discs keyed to said co-extensive portion of each shaft, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, rigid link means extending diagonally between said bushing members and directly pivotally connected thereto, means for adjusting said bushing members in the frame axially of said shafts to change the transmission ratio of the transmission, and control means operable in response to said movement of said bushing members for adjusting the effective length of said link means to maintain the pressure between said ring and said discs substantially constant.

2. An arrangement according to claim 1 in which said control means is impositively actuated so that adjustment of the effective length of said link means is accomplished only when the pressure between the ring and discs is below a predetermined amount.

3. In an infinitely variable speed transmission; a frame, a pair of parallel shafts in the frame having co-extensive portions, a set of two cone discs keyed to each of said co-extensive portions of said shafts, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, link means extending diagonally between said bushing members and pivotally connected thereto, means for adjusting said bushing members in the frame axially of said shafts to change the transmission ratio of the transmission, eccentric means positioned between said link means and at least one of the pivotal connections thereof with said bushing members, and control means operable in response to movement of said bushing members during adjustment of the transmission ratio of said transmission for biasing said eccentric in a direction to reduce the effective length of said link means.

4. An arrangement according to claim 3 in which means are provided between the eccentric means and the link means for preventing rotation of the eccentric means in a direction to increase the effective length of said link means.

5. In an infinitely variable speed transmission; a frame, a pair of parallel shafts in the frame having co-extensive portions, a set of two cone discs keyed to said co-extensive portions of each said shaft, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, link means extending diagonally between said bushing members and pivotally connected thereto, means for adjusting said bushing members in the frame axially of said shafts to change the transmission ratio of the transmission, eccentric means positioned between said link means and at least one of the pivotal connections thereof with said bushing members, and control means operable in response to movement of said bushing members during adjustment of the transmission ratio of said transmission for biasing said eccentric in a direction to reduce the effective length of said link means, other eccentrics at the other end of said link means interposing between the link means and its pivotal connection with the other bushing member, said other eccentric means being angularly adjustable to effect an initial adjustment of the effective length of said link means.

6. In an infinitely variable speed transmission; a frame, a pair of parallel shafts in the frame having co-extensive portions, a set of two cone discs keyed to said co-extensive portion of each shaft, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, link means extending diagonally between said bushing members and pivotally connected thereto, means for adjusting said bushing members in the frame axially of said shafts to change the transmission ratio of the transmission, eccentric means in said link means at one end between the link means and the pivotal connection with one of said bushing members, a lever swingably mounted on said eccentric means, one-way drive means between said lever and said eccentric means, and means responsive to axial movement of said bushing members in said frame for biasing said lever angularly of the axis of said eccentric means.

7. An arrangement according to claim 6 which includes one-way brake means between the eccentric means and link means acting in a direction opposite to the said one-way drive means.

8. In an infinitely variable speed transmission; a frame, a pair of parallel shafts in the frame having co-extensive portions, a set of two cone discs keyed to said co-extensive portion of each shaft, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, link means extending diagonally between said bushing members and pivotally connected thereto, means for adjusting said bushing members in the frame axially of said shafts to change the transmission ratio of the transmission, eccentric means in said link means at one end between the link means and the pivotal connection with one of said bushing members, a lever swingably mounted on said eccentric means, one-way drive means in the frame engaging opposite sides of said lever, means in the frame engaging opposite sides of said lever and means responsive to axial movement of said bushing members in said frame for causing said spring means to bias said lever in one direction of rotation or the other relative to the axis of said eccentric means.

9. In an infinitely variable speed transmission; a frame, a pair of parallel shafts in the frame having co-extensive portions, a set of two cone discs keyed to said co-extensive portions of each shaft, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, link means extending diagonally between said bushing members and pivotally connected thereto, means for adjusting said bushing members in the frame axially of said shafts to change the transmission ratio of the transmission, and control means operable in response to said movement of said bushing member for adjusting the effective length of said link means to maintain the pressure between said link and said discs substantially constant, said link means comprising a link member on each side of said bushing members whereby to balance at least a portion of the tilting force imposed on the discs pertaining to said bushing members.

10. In an infinitely variable speed transmission; a frame, a pair of parallel shafts in the frame having co-extensive portions, a set of two cone discs keyed to said co-extensive portion of each shaft, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, link means extending diagonally between said bushing members and pivotally connected thereto, means for adjusting said bushing members in the frame axially of said shafts to change the transmission ratio of the transmission, eccentric means in said link means at one end between the link means and the pivotal connection with one of said bushing members, a lever swingably mounted on said eccentric means, one-way drive means between said lever and said eccentric means, a U-shaped spring in the frame, the end of said lever being received between the ends of the legs of said spring so that axial movement of said bushing members in said frame will cause said lever to be biased in one direction of rotation or the other relative to the axis of said eccentric means, and stop means between said link means and said lever for limiting the amount of movement of the lever in at least one direction to limit the amount of flexure of the legs of said spring.

11. In an infinitely variable speed transmission; a frame, a pair of parallel shafts in the frame having co-extensive portions, a set of two cone discs keyed to said co-extensive portion of each shaft, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, means for moving said bushing member in said frame, and rigid link means extending diagonally of said frame and directly connected to said bushing members whereby to absorb tilting forces exerted on said bushing members and their pertaining discs during operation of said transmission and to cause movement of said bushing members in unison.

12. In an infinitely variable speed transmission; a frame, a pair of parallel shafts in the frame having co-extensive portions, a set of two cone discs keyed to said co-extensive portion of each shaft, a rigid drive ring entrained about the two sets of cone discs, a diagonally located pair of said discs consisting of one disc on each shaft being axially non-movable in the frame, bushing members rotatably supporting the other diagonally located pair of discs and reciprocable in the frame axially of the shafts, means for moving said bushing members in said frame, and rigid link means extending diagonally of said frame and directly connected to said bushing members whereby to absorb tilting forces exerted on said bushing members and their pertaining discs during operation of said transmission, said link means comprising a substantially rigid link on each side of the frame extending between said bushing members and causing movement of said bushing members in unison.

References Cited by the Examiner
UNITED STATES PATENTS

| | | | |
|---|---|---|---|
| 2,032,015 | 2/36 | Heynau | 74—192 X |
| 2,441,276 | 5/48 | Kuner et al. | 74—192 |
| 2,573,937 | 11/51 | Turnbull | 74—230.17 |
| 2,611,276 | 9/52 | Heynau | 74—192 |

DON A. WAITE, *Primary Examiner.*